United States Patent
Lin et al.

(10) Patent No.: US 6,845,797 B2
(45) Date of Patent: Jan. 25, 2005

(54) TIRE COMPOSITIONS COMPRISING EPOXIDIZED NATURAL RUBBER AND A FUNCTIONALIZED POLYOLEFIN

(75) Inventors: Chenchy Jeffrey Lin, Hudson, OH (US); William L. Hergenrother, Akron, OH (US)

(73) Assignee: Bridgestone Corporation, Tokyo (JP)

(*) Notice: Subject to any disclaimer, the term of this patent is extended or adjusted under 35 U.S.C. 154(b) by 50 days.

(21) Appl. No.: 10/269,445

(22) Filed: Oct. 11, 2002

(65) Prior Publication Data

US 2003/0130401 A1 Jul. 10, 2003

Related U.S. Application Data

(60) Provisional application No. 60/328,840, filed on Oct. 12, 2001.

(51) Int. Cl.$^7$ .................................................. B60C 1/00
(52) U.S. Cl. ....................... 152/525; 156/112; 523/437; 523/466; 523/468; 525/331; 525/331.7; 525/383; 525/386
(58) Field of Search .......................... 152/525; 156/112; 523/437, 466, 468; 525/331.7, 331, 383, 386

(56) References Cited

U.S. PATENT DOCUMENTS

| | | | |
|---|---|---|---|
| 5,118,546 A | 6/1992 | Burlett et al. | 428/36.8 |
| 5,396,940 A | 3/1995 | Segatta et al. | 152/209 |
| 5,447,976 A | 9/1995 | Curtin et al. | 523/438 |
| 5,736,593 A | 4/1998 | Sandstrom | 523/437 |
| 6,046,279 A | 4/2000 | Roberts et al. | 525/285 |
| 6,069,202 A * | 5/2000 | Venkataswamy et al. | 525/66 |

* cited by examiner

*Primary Examiner*—Philip Tucker
*Assistant Examiner*—D. Aylward
(74) *Attorney, Agent, or Firm*—Arthur M. Reginelli; Meredith E. Palmer

(57) ABSTRACT

A tire comprising a tread, where said tread includes a vulcanized rubber, where said vulcanized rubber includes from about 0.5 to about 40 weight percent epoxidized rubber; from about 1 to about 35 parts by weight of a functionalized polyolefin per 100 parts by weight of said vulcanized rubber; and from about 1 to about 100 parts by weight silica per 100 parts by weight of said vulcanized rubber.

24 Claims, No Drawings

TIRE COMPOSITIONS COMPRISING EPOXIDIZED NATURAL RUBBER AND A FUNCTIONALIZED POLYOLEFIN

This application claims the benefit of provisional application No. 60/328,840 filed Oct. 12, 2001.

FIELD OF THE INVENTION

This invention relates to tire compositions comprising epoxidized rubber and a functionalized polyolefin.

BACKGROUND OF THE INVENTION

Hysteresis loss and storage modulus are properties of rubber that have a significant impact on tire performance. Hysteresis loss can be defined by the formula $\tan \delta = G''/G'$, where $G''$ is a measure of the dynamic loss modulus and $G'$ is the measure of storage modulus, which is indicative of hardness. Generally, as the temperature of a tire increases, $G'$ decreases. As a result, there may be a decrease in handling.

Inorganic fillers, such as silica, impart improved wet traction (as demonstrated by a high $\tan \delta$ at 0° C.) and improved snow traction (as demonstrated by a high $\tan \delta$ at −20° C.) when used as filler within tire treads. Mixing silica into a tire stock, however, is difficult because silica particles agglomerate and therefore they are not easily dispersed. In response, processing and dispersing aids are used during compounding. Unfortunately, the use of these processing and dispersing aids may enhance the decrease in modulus at high temperatures.

Because inorganic fillers are technologically useful, there is a need to overcome the problems associated with the loss of $G'$ at elevated temperatures in tire treads containing inorganic fillers.

SUMMARY OF THE INVENTION

In general the present invention provides a tire comprising a tread, where the tread includes a vulcanized rubber, where the vulcanized rubber includes from about 0.5 to about 40 weight percent epoxidized rubber, from about 1 to about 35 parts by weight of a functionalized polyolefin per 100 parts by weight of the vulcanized rubber, and from about 1 to about 100 parts by weight silica per 100 parts by weight of the vulcanized rubber.

The present invention also includes a tire component comprising vulcanized rubber, where the vulcanized rubber includes epoxidized rubber, a functionalized polyolefin, and silica.

The present invention further includes a rubber vulcanizate comprising vulcanized rubber, where the vulcanized rubber includes epoxidized rubber, a functionalized polyolefin, and silica.

The present invention still further includes a method of producing a tire, the method comprising mixing a tire formulation that comprises a rubber component, a functionalized polyolefin, silica, and a vulcanizing agent, where the rubber component includes an epoxidized rubber, preparing an uncured tire component from the tire formulation, fabricating an uncured tire from the tire component and curing the tire.

The addition of epoxidized rubber and functionalized polyolefin to compositions for making tires has advantageously provided tire components and rubber vulcanizates that do not demonstrate many of the disadvantages associated with the prior art compositions, especially those including silica. Namely, embodiments of this invention demonstrate stabilized $G'$ at elevated temperatures. As also demonstrated by embodiments of this invention, the unique combination of epoxidized rubber and functionalized polyolefins within compositions has advantageously provided compositions that have improved cure characteristics. Moreover, embodiments of this invention are characterized by an improvement in rolling resistance without a deleterious impact on handling performance. Still further, embodiments of this invention demonstrate improved mechanical properties, especially where the vulcanizates have been heat aged.

DETAILED DESCRIPTION OF ILLUSTRATIVE EMBODIMENTS

Tires and tire components are prepared from rubber compositions comprising a rubber, an epoxidized rubber, a silica filler, and a functionalized polyolefin comprising pendent or terminal functional groups comprising acid or anhydride groups. Other additives typically employed in rubber compositions, especially those used to fabricate tires, may also be included.

Both synthetic and natural rubber may be employed as the base rubber within the rubber compositions. These rubbers, which may also be referred to as elastomers, include, without limitation, natural rubber, synthetic polyisoprene, poly(styrene-co-butadiene), polybutadiene, poly(styrene-co-butadiene-co-isoprene), poly(styrene-co-isoprene), and mixtures thereof.

Epoxidized rubber is a modified rubber where some of the rubber's unsaturation is replaced by epoxide groups. This modification is typically accomplished by an epoxidation reaction.

Epoxidation reactions can be effected by reacting an unsaturated rubber with an epoxidizing agent. Useful epoxidizing agents include peracids such as m-chloroperbenzoic acid and peracedic acid. Other examples include carboxylic acids, such as acetic and formic acid, or carboxylic anhydrides such as acetic anhydride, together with hydrogen peroxide. A catalyst, such as sulfuric acid, p-tolulene sulfonic acid, or a cationic exchange resin such as sulfonated polystyrene may optionally be employed.

Epoxidation is preferably conducted at a temperature from about 0° to about 150° C. and preferably from about 25° to about 80° C. The time required to effect the epoxidation reaction is typically from about 0.25 to about 10 hours, and preferably from about 0.5 to about 3 hours.

The epoxidation reaction is preferably conducted in a solvent that is capable of substantially dissolving the rubber both in its original condition and after epoxidation. Suitable solvents include aromatic solvents such as benzene, tolulene, xylene, and chlorobenzene, as well as cycloaliphatic solvents such as cyclohexane, cycloheptane, and mixtures thereof.

After epoxidation, the epoxidized rubber is preferably removed or isolated from the acidic environment, which may include the epoxidizing agents as well as the acidic catalyst. This isolation can be accomplished via filtration, or by adding a dilute aqueous base to neutralize the acid and then subsequently coagulate the polymer. The polymer can be coagulated by using an alcohol such as methanol, ethanol, or propanol. An antioxidant is typically added after the isolation procedure, and the final product may be dried by using techniques such as vacuum distillation. Alternatively, other known methods for removing polymers from hydrocarbon solvents and the like may be employed including steam stripping and drum drying.

The rubber that can be epoxidized includes both synthetic and natural rubber. The synthetic rubber can include, but is not limited to, those rubbers that derive from the polymerization of conjugated dienes alone or in combination with vinyl aromatic monomers. Examples of useful rubbers include natural rubber and synthetic rubbers such as polyisoprene, poly(styrene-co-butadiene), polybutadiene, poly(styrene-co-butadiene-co-isoprene), poly(styrene-co-isoprene), and mixtures thereof.

Useful epoxidized rubber will have an extent of epoxidation of about 5 to about 95 mole %, preferably from about 15 to about 80 mole %, and more preferably from about 25 to about 50 mole %, where the extent of epoxidation is defined as the mole percentage of olefinically unsaturated sites originally present in the rubber that have been converted to oxirane, hydroxyl, or ester groups.

The Mooney viscosity ($ML_{1+4}$@100° C.) of the epoxidized rubber can also very greatly, although it is preferred that the Mooney viscosity be from about 85 to about 170, more preferably from about 95 to about 155, and more preferably from about 105 to about 145.

Epoxidized natural rubber is commercially available under the tradenames ENR 25, which contains about 25 mole % epoxidation, and ENR 50, which contains about 50 mole % epoxidation (Gurthie Inc.; Malaysia).

The functionalized polyolefin additive includes an α-olefin polymer or copolymer that contains terminal or pendent moieties containing acid or anhydride groups.

The terminal or pendent moieties typically derive from unsaturated carboxylic acids or unsaturated anhydrides. Examples of unsaturated carboxylic acids include citraconic acid, cinnamic acid, methacrylic acid, and itaconic acid. Examples of unsaturated anhydrides include maleic anhydride, citraconic anhydride, and itaconic anhydride. The preferred terminal or pendent moieties are succinic anhydride groups, or the corresponding acid from a ring opening structure, that derives from maleic anhydride.

The functionalized α-olefin polymer or copolymer includes an α-olefin homopolymer, a copolymer of two or more α-olefins, or a copolymer of an α-olefin with a compatible monomer. The α-olefins can include from about 2 to about 8 carbon atoms, and more preferably from 3 to about 5 carbon atoms. Exemplary α-olefin monomers include ethylene, propylene, butene-1, and pentene-1. Exemplary monomers that can be co-polymerized with α-olefins include vinyl aromatic monomers and diene monomers.

An exemplary copolymer is poly(propylene-co-ethylene) that contains polyethylene crystals. The preferred poly(propylene-co-ethylene) contains from about 0.05 to about 35% by weight ethylene, more preferably from about 0.1 to about 30% by weight ethylene, and even more preferably from about 1 to about 25% by weight ethylene, with the balance being propylene.

The functionalized polyolefins should contain from about 0.01 to about 10 percent by weight (pbw) of the functional moiety based upon the weight of the entire polymer. More preferably, the functionalized polyolefin should contain from about 0.05 to about 5 pbw of the functional moiety, even more preferably from about 0.75 to about 2 pbw of the functional moiety, and still more preferably from about 0.15 to about 1.0 pbw of the functional moiety based upon the weight of the entire polymer.

The functionalized polyolefin additive is preferably crystalline. Accordingly, the preferred functionalized polyolefin should have at least 10% crystallinity, more preferably at least 20% crystallinity, even more preferably at least about 40% crystallinity, and still more preferably at least about 60% crystallinity as can be measured by thermal analysis such as differential scanning calorimetry, x-ray diffraction, or density measurements. Further, the preferred functionalized polyolefin additive has a melting temperature of about 90° to about 185° C., more preferably from about 100° to about 175° C., and even more preferably from about 110° to about 170° C.

The number average molecular weight ($M_n$) of the functionalized polyolefins can vary greatly, although it is preferred that the $M_n$ be from about 20,000 to about 500,000, more preferably from about 100,000 to about 400,000, and even more preferably from about 150,000 to about 400,000, as determined by using standard GPC analysis with polystyrene as a standard. Generally, the molecular weight distribution ($M_w/M_n$) should be less than about 4.5, preferably less than about 4.0, and even more preferably less than about 3.8.

The functionalized polyolefin additives are typically prepared by grafting unsaturated carboxylic acids or unsaturated anhydrides to a polyolefin polymer.

The techniques employed to attach the terminal or pendent moieties that contain carboxylic acid or anhydride groups to a polyolefin polymer are well known in the art. For example, grafting maleic anhydride to a polyolefin is disclosed in U.S. Pat. No. 6,046,279, which is incorporated herein by reference.

The α-olefin polymers can be synthesized by using a number of polymerization techniques such as, but not limited to, the "Phillips catalyzed reactions" conventional Ziegler-Natta type polymerizations, and metallocene catalysis including, but not limited to, metallocene-aluminoxane and metallocene-ionic activator catalysis.

Exemplary α-olefin polymers include polyethylene, polypropylene, poly(ethylene-co-propylene), poly(propylene-co-butene-1), and poly(butene-1-co-ethylene). These α-olefin polymers can be either amorphous, semi-crystalline, or crystalline polymers. The preferred polyolefins include crystalline or stereoregular polypropylene. Most polypropylene homopolymers that are commercially produced have an isotactic microstructure. The poly(propylene-co-ethylene) copolymers can be random or block copolymers. Preferably, these copolymers will contain some polyethylene crystals, although they should include a major amount of propylene units and only a minor amount of ethylene units. Preferably, these copolymers should contain less than about 40 percent by weight (pbw) ethylene units, more preferably from about 1 to about 30 pbw ethylene units, and more preferably from about 1.5 to about 25 pbw ethylene units.

Functionalized polyolefins are commercially available. For example, maleic anhydride functionalized polypropylene is available under the tradename EXXELOR™ PO1015 & 1020 (Exxon Mobil Chemical Company; Houston, Tex.), under the tradename PP-C™, CA1000, CA100, OE707, or 18707 (Elf Atochem; Philadelphia, Pa.), or under the tradename Polybond™ 3001, 3002, or 3150 (Uniroyal Chemical Company; Middlebury, Conn.).

The rubber compositions include an inorganic filler as well as optional organic fillers. The inorganic fillers may include silica, aluminum hydroxide, magnesium hydroxide, and clays (hydrated aluminum silicates). Organic fillers include carbon black and starch.

Useful silica (silicon dioxide) includes wet-process, hydrated silica produced by a chemical reaction in water, and precipitated as ultra-fine spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 $m^2/g$, preferably about 100 to about 250 $m^2/g$, and more preferably about 150 to about 220 $m^2/g$. The pH of the silica filler is generally about 5.5 to about 7 and preferably about 5.5 to about 6.8. Commercially available silicas include Hi-Sil™ 215, Hi-Sil™ 233, and Hi-Sil™ 190 (PPG Industries; Pittsburgh, Pa.). Useful commercial grades of different silicas are also available from other sources including Rhone Poulenc.

Useful aluminum hydroxide fillers include any aluminum hydroxide filler including those that have conventionally been employed to reinforce rubber compositions and tire components.

Aluminum hydroxide filler preferably has an average diameter of about 20 nanometers (nm) to about 2,000 nm, more preferably from about 25 nm to about 1,000 nm or smaller, and even more preferably from about 30 nm to about 50 nm.

Useful aluminum hydroxide preferably has a BET specific surface area of from about 0.5 to about 500 $m^2/g$, more preferably from about 1 to about 400 $m^2/g$, and even more preferably from about 2 to about 300 $m^2/g$.

Aluminum hydroxide filler may be treated with various surface treating agents. Non-limiting examples of surface treating agents include organic treating agents such as fatty acids and alcohols, and inorganic dispersants such as coupling agents and fatty acid metal salts.

Useful aluminum hydroxide filler is commercially available from a number of sources including that available under the tradenames Hygilite™ (Showa Dendo K.K.; Japan), Baikalox™ (Baikowski Chimie; France), and RF22™ (Sumitono Chemical Co.; Japan).

Useful carbon black may include any commonly available carbon black, but those having a surface area (EMSA) of at least 20 $m^2/g$, and more preferably at least 35 $m^2/g$ up to 200 $m^2/g$ or higher, are preferred. Surface area values used in this application are those determined by ASTM test D-1765 by using the cetyltrimethyl-ammonium bromide (CTAB) technique.

A coupling agent may optionally be added when an inorganic filler such as silica is used. Coupling agents include those compounds that are believed to react with both the rubber and the inorganic filler. One coupling agent conventionally used is bis-[3(triethoxysilyl) propyl]-tetrasulfide, which is commercially available under the tradename S169 (Degussa, Inc.; New York, N.Y.). Other coupling agents include bis-[3(triethoxysilyl) propyl]-disulfide, which is commercially available under the tradename Silquest™ (Witco; Greenwich, Conn.), mercapto propyl alkoxy silane, which is commercially available under the tradename Ciptane™ (Dow Corning; Midland, Mich.), and dithio diproprionic acid or carboxylic acid disulfides, which are commercially available from Aldrich Chemical Company. In general, these coupling agents should be used in an amount from about 0.1 to 20% by weight based upon the weight of the inorganic filler.

Shielding and dispersing agents, which prevent or alleviate the agglomeration of inorganic filler particles such as silica, may also be used. Typically, these agents react or interact with the filler. Exemplary dispersing or shielding agents include silanes, amines, diols, polyethers, amides, and sugar fatty acid esters. U.S. Pat. Nos. 5,719,207, 5,780, 538, 5,717,022, and EP 0890606 are incorporated herein by reference in this regard. Specific examples of these agents include sugar, fatty acids such as sorbitan fatty acids which are available from BASF (Mount Olive, N.J.), and octyl triethoxy silane, which is available from Dow Corning (Midland, Mich.). Generally, these shielding or dispersing agents may be used in an amount from about 0.1 to about 20% by weight based on the weight of the inorganic filler. In preferred embodiments, the coupling agents, shielding agents, and dispersing agents may be used in combination.

A multitude of rubber curing agents may be employed. For example, sulfur or peroxide-based curing systems may be employed. Also, see Kirk-Othmer, ENCYCLOPEDIA OF CHEMICAL TECHNOLOGY, $3^{rd}$ Edition, Wiley Interscience, N.Y. 1982, Vol. 20, pp. 365–468, particularly VULCANIZATION AGENTS AND AUXILIARY MATERIALS pp. 390–402, or *Vulcanization* by A. Y. Coran, ENCYCLOPEDIA OF POLYMER SCIENCE AND ENGINEERING, $2^{nd}$ Edition, John Wiley & Sons, Inc., 1989, which are incorporated herein by reference. Vulcanizing agents may be used alone or in combination.

The rubber compositions and tire components may also include other compounding additives such as accelerators, oils, waxes, scorch inhibiting agents, processing aids, antidegradants, processing oils, zinc oxide, optional tackifying resins, optional reinforcing resins, optional fatty acids, and optional peptizers.

The rubber compositions and tire components of the present invention include a rubber component that comprises a base rubber and the epoxidized rubber. The rubber component comprises from about 0.5 to about 40%, preferably from 1 to about 20 weight %, more preferably from about 1.5 to about 15 weight %, and still more preferably from about 2 to about 10 weight % of the epoxidized rubber, with the balance being the base rubber.

The rubber compositions and tire components will generally contain from about 1 to about 35 parts by weight of the functionalized polyolefin additive per 100 parts by weight of the rubber component (phr), which includes the base rubber and the epoxidized rubber. Preferably, the rubber compositions and tire components will contain from about 2 to about 25 parts by weight phr, even more preferably from about 4 to about 20 parts by weight phr, and still more preferably from about 6 to about 14 parts by weight phr of the functionalized polyolefin additive.

Fillers, such as carbon black, silica or aluminum hydroxide, are typically employed in an amount from about 1 to about 100 parts by weight phr, and preferably from about 20 to about 90 parts by weight phr, and more preferably from about 40 to about 80 parts by weight phr.

Silica may optionally be used in an amount from about 10 to about 100 parts by weight phr, preferably from about 15 to about 90 parts by weight phr, and more preferably from about 20 to about 80 parts by weight phr.

Carbon black may optionally be used in an amount from about 0.5 to about 60 parts by weight phr, preferably from about 1 to about 40 parts by weight phr, and more preferably from about 2 to about 25 parts by weight phr.

Particularly, aluminum hydroxide filler should be employed in an amount from about 1 to about 25 parts by weight phr, preferably from about 2 to about 20 parts by weight phr, and more preferably from about 5 to about 15 parts by weight phr.

In a preferred embodiment, aluminum hydroxide, silica, and carbon black are used in combination. In this embodiment, the silica:carbon black ratio is from about 1:10 to about 99:1, more preferably from about 1:5 to about 5:1, and even more preferably from about 1:3 to about 3:1. And, the silica:aluminum hydroxide ratio is from about 3:1 to about 30:1, more preferably from about 5:1 to about 20:1, and even more preferably from about 6:1 to about 15:1.

Those skilled in the art will be able to choose a useful amount of the other ingredients that may be employed in practicing the present invention. For example, it is generally known in the art of making tire components, such as treads, that sulfur is typically should be employed in an amount from about 0.5 to about 10 parts by weight phr, and preferably from about 1 to about 6 parts by weight phr. Oils are typically employed in an amount from about 1 to about 60 parts by weight phr, and preferably in an amount from about 1 to about 50 parts by weight phr. Zinc oxide is typically employed in an amount from about 0.5 to about 8, and preferably from about 1 to about 5 parts by weight phr.

Tire formulations are compounded by using mixing equipment and procedures conventionally employed in the art. Preferably, an initial masterbatch is prepared that includes the elastomer component and the reinforcing fillers, as well as other optional additives such as processing oil and antioxidants. The epoxidized rubber is preferably added during preparation of the initial masterbatch. To prevent premature vulcanization (scorch), this initial masterbatch generally excludes the vulcanizing agents. Once this initial masterbatch is processed, the vulcanizing agents are blended into the composition at lower temperatures. Rubber compounding techniques and the additives employed therein are generally known as disclosed in *The Compounding and Vulcanization of Rubber*, by Stevens in RUBBER TECHNOLOGY SECOND EDITION (1973 Van Nostrand Reinhold Company). The mixing conditions and procedures applicable to silica-filled tire formulations are also well known as described in U.S. Pat. Nos. 5,227,425, 5,719,207, 5,717,022, as well as EP 0890606, all of which are incorporated herein by reference.

The composition can then be processed into tire components according to ordinary tire manufacturing techniques including standard rubber molding and curing techniques. Typically, vulcanization is effected by heating the vulcanizable composition; e.g., it is heated to about 170° C. Cured or crosslinked polymers may be referred to as vulcanizates, which are generally three-dimensional polymeric networks that are thermoset. The other ingredients, such as the functionalized polyolefin and fillers, are generally dispersed throughout this thermoset network. Tire components of this invention preferably include tire treads. The compositions, however, can also be used to form other elastomeric tire components such as subtreads, black sidewalls, body ply skims, bead fillers and the like. Pneumatic tires can be made according to U.S. Pat. Nos. 5,866,171; 5,876,527; 5,931,211; and 5,971,046, which are incorporated herein by reference. The compositions of this invention advantageously exhibit the improvements discussed herein without the need for other additives such as nylon.

In order to demonstrate the practice of this invention, the following examples have been prepared and tested. The examples should not, however, be viewed as limiting the scope of the invention. The claims will serve to define the invention.

EXAMPLES

Stocks 1–6

Six tire stocks were prepared from the formulations in Table I by using the compounding protocol set forth in Table III by using a 310 gram Brabender mixer set at 60 r.p.m.

TABLE I

| Stock No. | 1 | 2 | 3 | 4 | 5 | 6 |
|---|---|---|---|---|---|---|
| Tin-Coupled Solution SBR | 75.00 | 75.00 | 75.00 | 75.00 | 75.00 | 75.00 |
| Natural Rubber | 25 | 20 | 20 | 25 | 20 | 20 |
| Epoxidized Natural Rubber | 0 | 5 | 5 | 0 | 5 | 5 |
| Polyolefins |  |  |  |  |  |  |
| Nonfunctionalized Polypropylene | — | — | 10 | — | — | — |
| Maleic Anhydride Modified Polypropylene | — | — | — | 10 | 10 | — |
| Maleic Anhydride Modified Propylene-ethylene | — | — | — | — | — | 10 |
| Carbon Black | 35.00 | 35.00 | 35.00 | 35.00 | 35.00 | 35.00 |
| Precipitated Silica | 30.00 | 30.00 | 30.00 | 30.00 | 30.00 | 30.00 |
| Naphthenic Process Oil | 15.0 | 15.0 | 15.0 | 15.0 | 15.0 | 15.0 |
| Wax | 1.5 | 1.5 | 1.5 | 1.5 | 1.5 | 1.5 |
| Antioxidant [N-(1,3-dimethylbutyl)-N'-phenyl-p-phenylene-diamine] | 0.95 | 0.95 | 0.95 | 0.95 | 0.95 | 0.95 |
| Si69 | 3.0 | 3.0 | 3.0 | 3.0 | 3.0 | 3.0 |
| Sulfur | 1.70 | 1.70 | 1.70 | 1.70 | 1.70 | 1.70 |
| Steric acid | 1.50 | 1.50 | 1.50 | 1.50 | 1.50 | 1.50 |
| Accelerator [N-Cyclohexyl-2-benzothiazyl-sulfenamide] | 1.50 | 1.50 | 1.50 | 1.50 | 1.50 | 1.50 |
| Diphenyl Guanidine | 0.5 | 0.5 | 0.5 | 0.5 | 0.5 | 0.5 |
| Zinc oxide | 2.5 | 2.5 | 2.5 | 2.5 | 2.5 | 2.5 |

The tin-coupled solution SBR was obtained under the tradename DURADENE™ SR7455 (Firestone Synthetic Rubber Company; Akron, Ohio). The epoxidized natural rubber was obtained under the trade name ENR25 (Guthrie). The non-functionalized polypropylene was obtained under the name PT340 (Aldrich). The maleic anhydride modified polypropylene and the maleic anhydride modified poly (propylene-co-ethylene) were obtained under the tradenames CA100 and OE707, respectively (Elf Atochem; Philadelphia, Pa.). These polyolefins are characterized in Table II.

TABLE II

|  | PP340 | CA100 | OE707 |
|---|---|---|---|
| MA Content Wt % | 0 | 1.0 | 0.48 |
| $M_w \times 1000$ | 340 | 350 | 360 |
| Monomeric unit | propylene | propylene | propylene ethylene |
| $T_m$ (° C.) | 161 | 161 | 120 and 150 |
| Crystallinity (%) | >75 | >75 | >75 |
| Ethylene content (%) | 0 | 0 | 21 |

TABLE III

| Master Batch Stage | |
|---|---|
| Initial Temperature | 100° C. |
| 0 sec | charging polymers and polyolefin (if added) |
| 30 sec | charging carbon black, silica, shielding agents, and all pigments |
| 5 min | drop |
| Drop Temperature | 175° C. |
| Remill 1 Batch Stage | |
| Initial Temperature | 70° C. |
| 0 sec | charging remilled stock |
| 30 sec | charging Si69 |
| Drop Temperature | 155° C. |
| Final Batch Stage | |
| Initial Temperature | 90° C. |
| 0 sec | charging remilled stock |
| 30 sec | charging curing agent and accelerators |
| Drop Temperature | 105° C. |

The final stocks were sheeted and subsequently molded at 171° C. for 15 minutes. The Mooney viscosity and curing characteristics of the uncured stocks were evaluated. Cured samples of each stock were evaluated for tensile mechanical properties at 25° C. and additionally, with Stocks 3–7, after heat aging at 100° C. for 24 hours. Furthermore, the dynamic viscoelastic properties of the cured stocks were measured by both temperature and strain sweeps. The results of this analysis are set forth in Table IV.

Mooney viscosity was conducted at 130° C. by using a large rotor and was recorded as the torque when the rotor rotated for four minutes. Each sample was preheated at 130° C. for one minute before the rotor started.

$T_5$ is the time required to increase five Mooney units during the Mooney-scorch measurement; it is used as an index to predict how fast the compound viscosity will rise during processing, such as extrusion processing. $T_{S2}$ and $T_{90}$ are the times when torque rises to 2% and 90% of the total torque increase during the curing characterization experiment at 171° C. They are used to predict the rate of viscosity build-up ($T_{S2}$) and the curing rate during the curing process. MH–ML is the value of the minimum and maximum torque recorded during the curing process; it is used to predict the degree of curing of the rubber stocks.

Tanδ at 0° C. data was obtained from temperature sweep experiments. Temperature sweep experiments were conducted with a frequency of 31.4 rad/sec by using 0.5% strain for the temperature range from –100° C. to –10°C., and 2% strain for the temperature range from –10° C. to 100° C. Payne effect (ΔG') and tanδ at 7% strain were obtained from the strain sweep experiment. A frequency of 3.4 rad/sec was used for the strain sweep conducted at 65° C. with strain sweeping from 0.25% to 14.75%.

The tensile mechanical properties were measured by using the standard procedure described in the ASTM-D 412 at 25° C. The tensile test specimens are round rings with a dimension of 0.1 centimeters in width and 0.19 centimeters in thickness. A specific gauge length of 2.5 centimeters is used for the tensile test. Tensile mechanical properties were also analyzed after thermal aging, which occurred at 100° C. for 24 hours.

TABLE IV

| Stock No. | 1 | 3 | 3 | 4 | 5 | 6 |
|---|---|---|---|---|---|---|
| Mooney Scorch and Curing Characteristics of the Green Stocks | | | | | | |
| Mooney Viscosity ($ML_{1+4}$ @ 130° C.) | 57.7 | 56.6 | 74.6 | 68.1 | 70.6 | 67.4 |
| $T_5$ Scorch @ 130° C. (min) | 1,140 | 1,283 | 1,317 | 1,151 | 1,334 | 1,330 |
| $T_{S2}$ @ 171° C. (min) | 2.15 | 2.4 | 2.67 | 2.23 | 2.54 | 2.63 |
| $T_{90}$ @ 171° C. (min) | 8.41 | 12.54 | 12.23 | 8.55 | 10.54 | 11.10 |
| Tensile Properties @ 25° C. | | | | | | |
| Modulus @ 50% (MPa) | 1.63 | 1.89 | 3.05 | 2.18 | 2.14 | 2.32 |
| Modulus @ 300% (MPa) | n/a | 11.85 | n/a | 15.17 | 14.04 | 15.52 |
| Tensile Strength @ Break (MPa) | 13.05 | 15.65 | 15.42 | 15.00 | 15.71 | 17.89 |
| Elongation @ Break (MPa) | 290 | 315 | 275 | 302 | 329 | 338 |
| Toughness (MPa) | 17.00 | 21.84 | 21.39 | 20.95 | 23.87 | 27.94 |
| Dynamic Viscoelastic Properties | | | | | | |
| tanδ @ 0° C. (temperature sweep) | 0.3212 | 0.3515 | 0.3234 | 0.3285 | 0.3375 | 0.3124 |
| tanδ @ 50° C. (temperature sweep) | 0.1893 | 0.2073 | 0.1781 | 0.1759 | 0.1773 | 0.1772 |
| ΔG' (G' @ .25%-G' @ 14.75%) @ 65° C. (MPa) | 0.2373 | 0.2200 | 0.3066 | 0.2285 | 0.2000 | 0.2368 |
| tanδ @ 7% strain @ 65° C. (strain sweep) | 0.1380 | 0.1378 | 0.1395 | 0.1266 | 0.1238 | 0.1383 |
| Tensile Properties @ 25° C. (after thermal aging) | | | | | | |
| Modulus @ 50% (MPa) | 2.10 | 2.39 | 3.70 | 2.54 | 2.89 | 3.02 |
| Tensile Strength @ Break (MPa) | 16.43 | 14.91 | 17.68 | 13.77 | 17.42 | 18.77 |
| Elongation @ Break (%) | 289 | 254 | 262 | 251 | 279 | 296 |
| Toughness (MPa) | 21.14 | 17.15 | 21.82 | 16.80 | 22.61 | 26.36 |

Various modifications and alterations that do not depart from the scope and spirit of this invention will become apparent to those skilled in the art. This invention is not to be duly limited to the illustrative embodiments set forth herein.

What is claimed is:

1. A tire comprising:
   a tread, where said tread includes
   a thermoset rubber network, where said thermoset rubber network includes from about 0.5 to about 40 weight percent epoxidized rubber that is vulcanized;
   from about 1 to about 35 parts by weight of a functionalized polyolefin per 100 parts by weight of said vulcanized rubber, where said functionalized polyolefin is an α-olefin polymer or copolymer that contains terminal or pendent moieties containing acid or anhydride groups; and
   from about 1 to about 100 parts by weight silica per 100 parts by weight of said vulcanized rubber.

2. The tire of claim 1, where said epoxidized rubber is epoxidized natural rubber.

3. A tire component comprising:
   a thermoset rubber network, where said thermoset rubber network that includes vulcanized epoxidized rubber;
   a functionalized polyolefin dispersed within said network, where said functionalized polyolefin contains terminal or pendent moieties containing acid or anhydride groups, and silica.

4. The tire component of claim 3, where said epoxidized rubber is epoxidized natural rubber.

5. The tire component of claim 4, where said epoxidized natural rubber includes from about 5 to about 95 mole percent epoxidation.

6. The tire component of claim 3, where said functionalized polyolefin is an α-olefin polymer or copolymer.

7. The tire component of claim 6, where said functionalized polyolefin includes maleic anhydride functionalized polypropylene.

8. The tire component of claim 6, where said functionalized polyolefin includes maleic anhydride functionalized poly(propylene-co-ethylene).

9. The tire component of claim 7, where said maleic anhydride functionalized polypropylene includes from about 0.01 to about 10 percent by weight functionalities deriving from maleic anhydride.

10. The tire component of claim 8, where said maleic anhydride functionalized poly(propylene-co-ethylene) includes from about 0.01 to about 10 percent by weight functionalities deriving from maleic anhydride.

11. The tire component of claim 3, where said vulcanized rubber includes from about 0.5 to about 40 weight percent vulcanized epoxidized rubber.

12. The tire component of claim 3, where said vulcanized rubber includes from about 1 to about 20 weight percent vulcanized epoxidized rubber.

13. The tire component of claim 3, where the tire component comprises from about 2 to about 25 parts by weight of said functionalized polyolefin per 100 parts by weight of said vulcanized rubber.

14. The tire component of claim 3, where the tire component comprises from about 6 to about 14 parts by weight of said functionalized polyolefin per 100 parts by weight of said vulcanized rubber.

15. The tire component of claim 3, where said tire component comprises from about 15 to about 90 parts by weight of said silica per 100 parts by weight of said vulcanized rubber.

16. The tire component of claim 3, where said tire component further comprises from about 0.5 to about 60 parts by weight carbon black per 100 parts by weight of said vulcanized rubber.

17. A method of producing a tire, the method comprising:
mixing a tire formulation that comprises a rubber component, a functionalized polyolefin, silica, and a vulcanizing agent, where the rubber component includes an epoxidized rubber, and where said functionalized polyolefin is an α-olefin polymer or copolymer that contains terminal or pendent moieties containing acid or anhydride groups;
preparing an uncured tire component from the tire formulation;
fabricating an uncured tire from the tire component; and
curing the tire.

18. The method of claim 17, where the rubber component includes from about 0.5 to about 40 weight percent of the epoxidized rubber.

19. The method of claim 17, where the functionalized polyolefin is maleic anhydride functionalized polypropylene or maleic anhydride functionalized poly(propylene-co-ethylene).

20. The tire component of claim 3, where said functionalized polyolefin has a crystallinity of at least 10%.

21. The tire component of claim 3, where said functionalized polyolefin has a crystallinity of at least 40%.

22. The tire component of claim 3, where said functionalized polyolefin has a crystallinity of at least 60%.

23. The tire component of claim 3, where said functionalized polyolefin has a melting temperature from about 90° C. to about 185° C.

24. The tire component of claim 3, where said functionalized polyolefin has a melting temperature from about 110° C. to about 170° C.

* * * * *